(12) United States Patent
Lemes da Silva et al.

(10) Patent No.: US 11,989,475 B2
(45) Date of Patent: May 21, 2024

(54) SELECTING A DISPLAY WITH MACHINE LEARNING

(71) Applicant: Hewlett-Packard Development Company, L.P., Spring, TX (US)

(72) Inventors: Fernando Lemes da Silva, Barueri (BR); Ricardo Ribani, Barueri (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 543 days.

(21) Appl. No.: 17/047,426

(22) PCT Filed: Oct. 9, 2018

(86) PCT No.: PCT/US2018/054976
§ 371 (c)(1),
(2) Date: Oct. 14, 2020

(87) PCT Pub. No.: WO2020/076300
PCT Pub. Date: Apr. 16, 2020

(65) Prior Publication Data
US 2021/0224011 A1    Jul. 22, 2021

(51) Int. Cl.
*G06F 3/14*      (2006.01)
*G06F 18/21*    (2023.01)
(Continued)

(52) U.S. Cl.
CPC .............. *G06F 3/14* (2013.01); *G06F 3/1423* (2013.01); *G06F 18/214* (2023.01);
(Continued)

(58) Field of Classification Search
None
See application file for complete search history.

(56) References Cited

U.S. PATENT DOCUMENTS

| 7,460,150 B1 | 12/2008 | Coughlan et al. |
| 7,743,340 B2 | 6/2010 | Horvitz et al. |

(Continued)

FOREIGN PATENT DOCUMENTS

| CN | 108351685 A | 7/2018 |
| CN | 108416363 A | 8/2018 |

(Continued)

OTHER PUBLICATIONS

Nicosia, M., & Kristensson, P. O. (Mar. 2018). Inattention-management middleware for human-in-the-loop multi-display applications. In 2018 IEEE International Conference on Pervasive Computing and Communications Workshops (PerCom Workshops) (pp. 71-76). IEEE. (Year: 2018).*

(Continued)

*Primary Examiner* — Eric Nilsson
(74) *Attorney, Agent, or Firm* — Quarles & Brady LLP

(57) ABSTRACT

Examples of methods performed by an electronic device are described. In some examples of the methods, a machine learning model is trained based on a plurality of interaction events and a corresponding plurality of images. In an example, each of the plurality of interaction events corresponds to one of a plurality of displays. In some examples of the methods, a display is selected of the plurality of displays based on the machine learning model. In an example, an object is presented on the display.

15 Claims, 7 Drawing Sheets

(51) Int. Cl.
*G06F 18/214* (2023.01)
*G06N 3/04* (2023.01)
*G06N 3/08* (2023.01)
*G06N 20/00* (2019.01)
*G06V 40/10* (2022.01)

(52) U.S. Cl.
CPC ........ *G06F 18/2155* (2023.01); *G06F 18/217* (2023.01); *G06N 3/04* (2013.01); *G06N 3/08* (2013.01); *G06N 20/00* (2019.01); *G06V 40/10* (2022.01)

(56) References Cited

U.S. PATENT DOCUMENTS

| | | |
|---|---|---|
| 8,711,091 B2 | 4/2014 | Nomura et al. |
| 8,902,156 B2 | 12/2014 | Chan et al. |
| 9,829,970 B2 | 11/2017 | Ellis et al. |
| 2011/0267374 A1 | 11/2011 | Sakata et al. |
| 2013/0054593 A1 | 2/2013 | Park et al. |
| 2013/0125044 A1 | 5/2013 | Saylor et al. |
| 2014/0022159 A1* | 1/2014 | Leigh ................ G06F 3/017 345/156 |
| 2014/0075336 A1 | 3/2014 | Curtis et al. |
| 2015/0086109 A1 | 3/2015 | Paris et al. |
| 2015/0355772 A1 | 12/2015 | Hewitt et al. |
| 2017/0372487 A1 | 12/2017 | Lagun et al. |
| 2018/0032301 A1 | 2/2018 | Jeacocke et al. |
| 2018/0189673 A1 | 7/2018 | Dalton et al. |

FOREIGN PATENT DOCUMENTS

| | | |
|---|---|---|
| WO | WO-2015050545 A1 | 4/2015 |
| WO | 2017/031089 A1 | 2/2017 |
| WO | 2019/148669 A1 | 8/2019 |

OTHER PUBLICATIONS

Hongtao, L., et al. "Applications of Deep Convolutional Neural Network in Computer Vision," Journal of Data Acquisition and Processing, vol. 31, No. 1, Jan. 15, 2016, pp. 1-17. (English Abstract Only).

Simonyan, Karen, et al., Very Deep Convolutional Networks for Large-Scale Image Recognition, ICLR 2015, Apr. 10, 2015, pp. 1-14.

* cited by examiner

SELECTING A DISPLAY WITH MACHINE LEARNING

BACKGROUND

Computer technology has advanced to become virtually ubiquitous in society and has been used to improve many activities in society. For example, computers are used to perform a variety of tasks, including work activities, communication, research, and entertainment.

DETAILED DESCRIPTION

Figure 1:
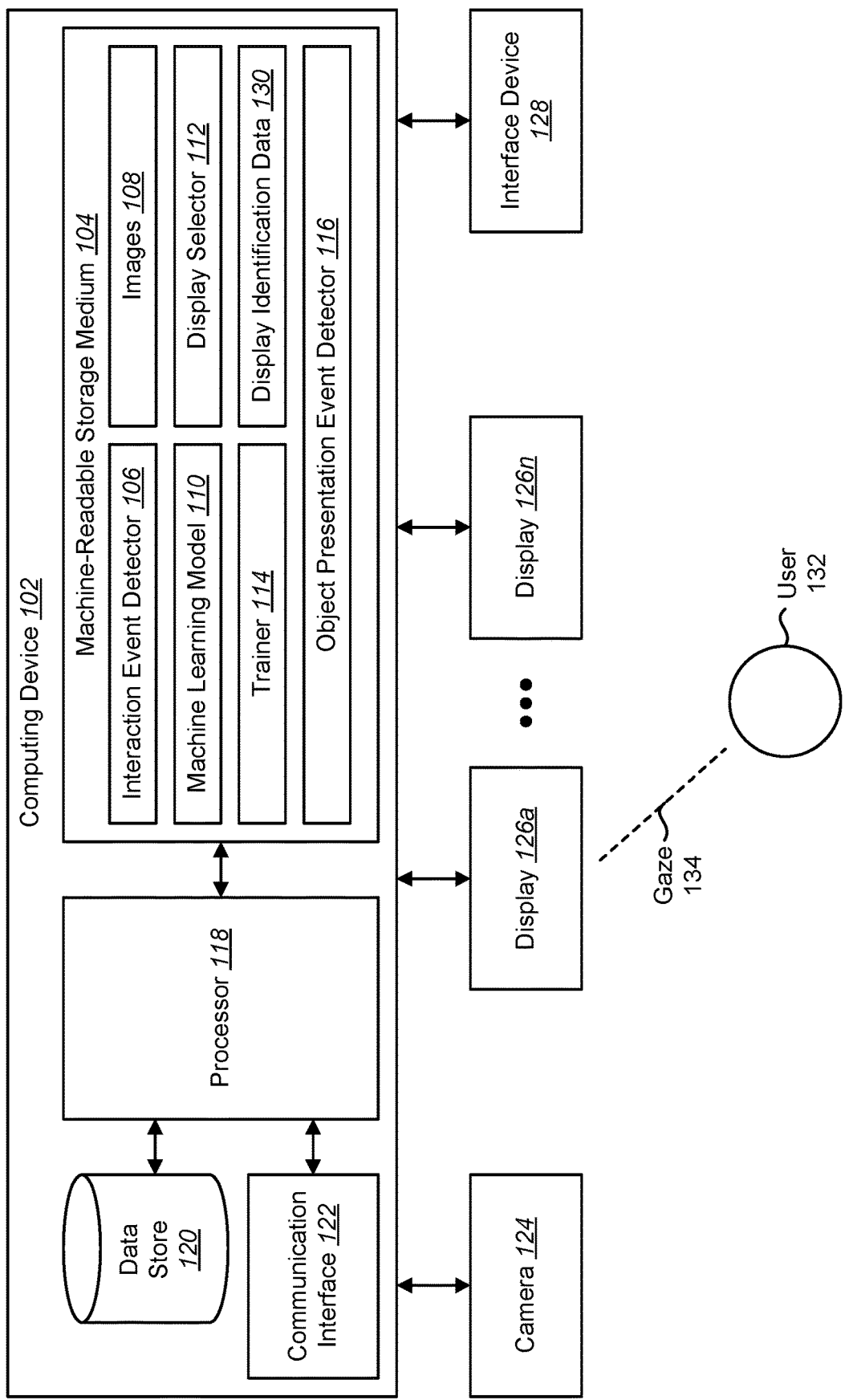
FIG. 1 is a block diagram of an example of a computing device that may be implemented to select a display with machine learning.

Some examples are described herein of systems and methods for object positioning on a multiple display setup using machine learning for gaze detection. In an environment where the user has multiple displays to view, the user may miss an object (e.g., notification, window, etc.) if it is not displayed on the display currently being viewed due to limitations of human vision in peripheral regions. For example, in a surveillance system scenario with a dozen displays, a user in charge of monitoring may miss some information about an alarm triggered or motion detected if the user is paying attention to a specific display when the information is presented on another display.

Some examples of the systems and methods described herein may provide an automatic way of detecting where a user is looking to display new notifications when using a multiple screen setup. For example, a viewed display (e.g., monitor) may be identified to show the notification using a machine learning model (e.g., algorithm) and training samples from the system itself. A machine learning model may be trained based on images captured from a camera when the user is interacting with programs using mouse click position to infer where the user is looking.

Some approaches may use a current position of a mouse or other pointing device to select a display, though the current position may not necessarily correspond to the display being currently viewed. Another approach may be to present information on all displays, although this approach may waste display and processing resources and may clutter the display space unnecessarily. Accordingly, it may be beneficial to determine the display being viewed (the "viewed display") based on where the user is looking.

Some examples of the systems and methods described herein may use gaze detection information to display notifications in more effective way in a controlled environment with multiple displays. Some examples are adaptive and use machine learning techniques. The use of machine learning and automatic training (e.g., not manual training) may be beneficial. For example, automatic training may avoid requiring a user to perform manual training and/or may avoid requiring a user to follow particular instructions for manual training, which may provide a more transparent and convenient training procedure. In a controlled scenario, some examples of the systems and methods described herein may be more accurate, since the data for detection is collected from the user.

Throughout the drawings, identical or similar reference numbers may designate similar, but not necessarily identical, elements. Some reference numbers may include a letter (e.g., display 126a, display 126n) to distinguish individual instances of an item. When such a reference number omits the letter, the reference number may refer generally to one or more, some, any, or all instances of an item. For example, a "display 126" may refer to one or more of displays 126a-n, some of displays 126a-n, any of displays 126a-n, or all of displays 126a-n. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a block diagram of an example of a computing device 102 that may be implemented to select a display with machine learning. A computing device is a type of electronic device that includes a processor 118 and a machine-readable storage medium 104 (e.g., memory). The processor 118 executes instructions stored in the machine-readable storage medium 104 to perform a variety of operations. For example, the processor 118 may run a program, which is a set of instructions or code that performs an operation when executed by the processor 118. Examples of programs include web browsers, word processors, calendar applications, video games, photo manipulation applications, document readers, email applications, presentation applications, video playback applications, audio playback applications, and others.

Examples of the computing device 102 include a personal computer, a desktop computer, a server computer, a tablet computer, laptop computer, smartphone, gaming console, smart appliance, vehicle console device, etc. The computing device 102 may include a processor 118, a data store 120, a machine-readable storage medium 104, and/or a communication interface 122. The computing device 102 may include additional components (not shown) and/or some of the components described herein may be removed and/or modified without departing from the scope of this disclosure.

The processor 118 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the machine-readable storage medium 104. The processor 118 may fetch, decode, and/or execute instructions (e.g., interaction event detector 106, machine learning model 110, display selector 112, trainer 114, and/or object presentation event detector 116) stored on the machine-readable storage medium 104. It should be noted that the processor 118 may be configured to perform any of the functions, operations, steps, methods, etc., described in connection with FIGS. 2-7 in some examples.

The machine-readable storage medium 104 (e.g., memory) may be any electronic, magnetic, optical, or other physical storage device that contains or stores electronic information (e.g., instructions and/or data). Thus, the machine-readable storage medium 104 may be, for example, random access memory (RAM), dynamic random access memory (DRAM), electrically erasable programmable read-only memory (EEPROM), magnetoresistive random-access memory (MRAM), phase change RAM (PCRAM), memristor, flash memory, a storage device, hard drive, magnetic disk, flash memory, an optical disc, and the like. In some implementations, the machine-readable storage medium 104 may be a non-transitory machine-readable storage medium, where the term "non-transitory" does not encompass transitory propagating signals. The machine-readable storage medium 104 (e.g., memory) may be coupled to the processor 118. An instruction set stored on the machine-readable storage medium 104 (e.g., memory) may cooperate with the processor 118 (e.g., may be executable by the processor 118) to perform any of the functions, operations, methods, steps, and/or procedures described herein.

Examples of instructions and/or data that may be stored in the machine-readable medium 104 include interaction event detector 106 instructions, machine learning model 110 instructions, display selector 112 instructions, trainer 114 instructions, object presentation event detector 116 instructions, images 108, and/or display identification data 130.

In some examples, the computing device 102 may also include a data store 120 on which the processor 118 may store information. The data store 120 may be volatile and/or non-volatile memory, such as dynamic random access memory (DRAM), EEPROM, magnetoresistive random-access memory (MRAM), phase change RAM (PCRAM), memristor, flash memory, hard drive, magnetic disk, and the like. In some examples, the machine-readable storage medium 104 may be included in the data store 120. Alternatively, the machine-readable storage medium 104 may be separate from the data store 120. In some approaches, the data store 120 may store similar instructions and/or data as that stored by the machine-readable storage medium 104. For example, the data store 120 may be non-volatile memory and the machine-readable storage medium 104 may be volatile memory.

In some examples, the computing device 102 may include a communication interface 122. The communication interface 122 may enable communication between the computing device 102 and one or more other electronic devices. For example, the communication interface 122 may provide an interface for wired and/or wireless communications. In some examples, the communication interface 122 may enable one or more kinds of cable and/or wireline (e.g., Universal Serial Bus (USB), Digital Visual Interface (DVI), Video Graphics Array (VGA), High Definition Multimedia Interface (HDMI), DisplayPort, Lightning, Ethernet, fiber optic cable, etc.) communication. For example, the communication interface 122 may include one or more ports (e.g., USB ports, DVI ports, VGA ports, HDMI ports, Lightning ports, Ethernet ports, etc.). In some examples, the communication interface 122 may be coupled to one or more antennas (not shown in FIG. 1) for transmitting and/or receiving radio frequency (RF) signals. For example, the communication interface 122 may enable one or more kinds of wireless (e.g., personal area network (PAN), Bluetooth, cellular, wireless local area network (WLAN), etc.) communication.

In some examples, multiple communication interfaces 122 may be implemented and/or utilized. For example, one communication interface 122 may be a PAN (e.g., Bluetooth) communication interface 122, another communication interface 122 may be a universal serial bus (USB) interface, another communication interface 122 may be an Ethernet interface, another communication interface 122 may be a wireless local area network (WLAN) interface (e.g., Institute of Electrical and Electronics Engineers (IEEE) 802.11 interface), and/or another communication interface 122 may be a cellular communication interface 122 (e.g., 3G, Long Term Evolution (LTE), Code Division Multiple Access (CDMA), etc.). In some configurations, the communication interface(s) 122 may send information (e.g., image capture command(s), image information for presentation on a display 126, etc.) to an electronic device (e.g., camera(s) 124, displays 126, interface device(s) 128, etc.) and/or receive information (e.g., captured image(s), input(s) from an interface device 128, etc.) from an electronic device (e.g., camera(s) 124, displays 126, interface device(s) 128, etc.).

In some examples, the computing device 102 may be in communication with (e.g., coupled to or linked to) and/or include one or more cameras 124, displays 126, and/or one or more interface devices 128. For example, one or more cameras 124, displays 126, and/or interface devices 128 may be coupled to the communication interface 122. In some examples, one or more cameras 124, displays 126, and/or interface devices 128 may be included in (e.g., integrated into or a part of) the computing device 102. In some examples, the computing device 102 may include one or more integrated and/or remote cameras 124, displays 126, and/or interface devices 128. For example, the computing device 102 may include an integrated display 126 and may be coupled to a remote display 126. In some examples, camera(s) 124, display(s) 126, and/or interface device(s) 128 may be integrated into one device. For example, a display 126 may include an integrated camera 124 and/or an integrated interface device 128 (e.g., touchscreen).

A camera 124 may capture images. For example, a camera 124 may be situated in order to capture images of a user (e.g., a user's face, eyes, etc.) while the user is using the computing device 102. Examples of the camera 124 include webcams, image sensors, integrated cameras, etc. In some examples, one or more cameras 124 may be in wired and/or wireless communication with the computing device 102 and/or may be included in the computing device 102. The camera 124 may provide images (e.g., still images, video frames, burst images, etc.) to the computing device. In some examples, a camera 124 may receive a capture command from the computing device 102 and may capture an image in response to the capture command. In some examples, the camera 124 may not be required to be directly facing the user 132. The camera 124 may have a field of view that includes the user 132. In some examples, the position of the camera 124 may change over time (with differing laptop or webcam positions, for instance).

A display 126 is a device that provides optical output. Multiple displays 126 may be utilized to present objects (e.g., images, user interface (UI) windows, notifications, user interface controls, still images, video, etc.). Examples of displays include screens, monitors, liquid crystal displays (LCDs), organic light emitting diode (OLED) displays, television displays, plasma displays, cathode ray tube (CRT) displays, electronic ink (E ink) displays, etc. In a multiple display 126a-n setup, a user 132 may direct the user's gaze 134 to one or more of the displays 126a-n. For example, a user's gaze 134 may be primarily directed to one of the displays 126a-n at a time.

An interface device 128 is an electronic device that enables user interaction with the computing device 102. One or more interface devices 128 may be utilized to provide input to the computing device 102. Examples of the interface device 128 include a mouse, keyboard, keypad, touchscreen, touchpad, button, switch, pointer device, controller, joystick, motion device, camera (for gesture recognition, for example), microphone (for speech recognition, for example), etc. In some examples, one or more interface devices 128 may be in wired and/or wireless communication with the computing device 102 and/or may be included in the computing device 102. The interface device(s) 128 may sense a user input (e.g., touch, click, motion, stylus, gesture, sound, actuation, etc.). The interface device(s) 128 may send and/or provide inputs to the computing device 102. In some examples, the interface device(s) 128 may send information indicating a location and/or action of an input. For example, a touchscreen may send information indicating length and direction of a swipe motion and/or location of a tap. In another example, a mouse may send information indicating amount and direction of movement and/or a click input.

The processor 118 may be in electronic communication with the machine-readable storage medium 104 (e.g., memory). As described above, the processor 118 may execute instructions (e.g., interaction event detector 106 instructions, machine learning model 110 instructions, display selector 112 instructions, trainer 114 instructions, and/or object presentation event detector 116 instructions) stored in the machine-readable storage medium 104. The instructions may be loaded into the processor 118 for execution.

The processor 118 may execute interaction event detector 106 instructions to implement and/or execute the interaction event detector 106. The interaction event detector 106 may receive a plurality of inputs from an interface device 128. For example, the processor 118 executing interaction event detector 106 instructions may receive information from one or more interface devices 128 indicating one or more inputs. The interaction event detector 106 may detect one or more (e.g., a plurality) of interaction events. An interaction event is a response of the computing device 102 to an input. A response to a click, touch, signal, gesture, motion, sound, and/or information, etc., from an interface device 128 is an interaction event. Each interaction event may correspond to one of the displays 126a-n. For example, a display on which a cursor is located when a click is received may indicate the correspondence between the interaction event and the display (e.g., identify a display corresponding to the interaction event). In another example, a display from which a touchscreen tap is received may indicate the correspondence between the interaction event and the display (e.g., identify a display corresponding to the interaction event).

The interaction event detector 106 may identify one or more of the displays 126a-n respectively corresponding to a plurality of inputs. For example, the interaction event detector 106 may store display identification data 130 according to each display corresponding to each interaction event. The display identification data 130 may indicate which of the displays 126a-n corresponds to each input and/or interaction event.

The machine-readable storage medium 104 may receive a plurality of images from the camera(s) 124. For example, the machine-readable storage medium 104 may receive and store a plurality of images 108. In some examples, one or more of the plurality of images 108 may be captured in response to one or more inputs. For example, when in a training mode, the processor 118 may command the camera(s) 124 to capture an image in response to an input from the interface device 128 and/or in response to detection of an interaction event. Accordingly, one or more of the images 108 may depict the user 132 (and the user's gaze 134) at or near (e.g., within a second, 0.5 seconds, 0.1 seconds, 50 milliseconds, 10 milliseconds, etc., of) a time an input is received and/or at or near (e.g., within a second, 0.5 seconds, 0.1 seconds, 50 milliseconds, 10 milliseconds, etc., of) a time an interaction event occurs. For example, when in training mode, the computing device 102 may collect display identification data 130 and images 108 corresponding to inputs and/or interaction events.

The processor 118 may execute trainer 114 instructions to implement and/or execute the trainer 114. The trainer 114 may train a machine learning model 110 based on the plurality of images 108 and the identified displays (e.g., the display identification data 130). The machine learning model 110 is a model or algorithm for inferring which of the displays 126a-n is a viewed display based on an image. As used herein, the term "infer" and variants thereof may mean to calculate a likely result based on input information using a machine learning model. For example, the machine learning model 110 may infer a viewed display based on an input image. In some examples, inferring a viewed display may include calculating probabilities that each of a plurality of displays may be a viewed display based on the input image. The inferred viewed display may be the display with the highest calculated probability.

Examples of the machine learning model 110 include neural networks. An example of a neural network is described in connection with FIG. 7. In some examples, the trainer 114 may train the machine learning model 110 by adjusting weights of the machine learning model 110 to more accurately infer one of the displays 126a-n that the user is viewing based on an image of the user. For example, the trainer 114 may adjust the weights of the machine learning model 110 such that the machine learning model 110 correctly identifies a viewed display (e.g., the display corresponding to the input and/or interaction event) from the image captured in response to the input and/or interaction event. Training the machine learning model 110 may enable the machine learning model 110 to infer a viewed display based on an image.

In some examples, the trainer 114 may determine a number of the displays 126a-n. For example, the trainer 114 may detect a number of displays 126a-n available for use by the computing device 102. In some approaches, the trainer 114 may request and/or receive a number of displays 126a-n that are available for use (or being used) as indicated by an operating system of the computing device 102. In some examples, the trainer 114 may set a number of outputs of the machine learning model 110 based on the number of the plurality of the displays. For example, the trainer 114 may set a number of outputs of the machine learning model 110 as equal to a number of the plurality of displays 126a-n.

The processor 118 may execute machine learning model 110 instructions to implement and/or execute the machine learning model 110. For example, the processor 118 may determine, using the machine learning model 110, a viewed display of the displays 126a-n. In some examples, the processor 118 may provide an image from the camera 124 to the machine learning model 110, where the machine learning model 110 may infer a viewed display based on the image.

In some examples, the processor 118 may determine the viewed display with the machine learning model 110 in response to an object presentation event. An object presentation event is an event where the computing device 102 anticipates presenting an object on a display 126. An example of an object presentation event is a call to the processor 118 (from an application or program, for instance) to present an object (e.g., window, notification, image, user interface, button, icon, etc.). For instance, a notification event may be an example of an object presentation event that triggers presentation of a notification. Examples of notifications include communication (e.g., instance messaging (IM), email, chat, text message, voicemail, phone call, etc.) notifications, calendar notifications, alarm notifications, reminder notifications, error notifications, security notifications (e.g., motion detection notifications, door alarm notifications, metal detection notifications, etc.), system notifications (e.g., malware detection notifications, software update notifications, etc.), news notifications, progress notifications (e.g., installation completion notifications, rendering completion notifications, simulations completion notifications, etc.), advertising notifications, navigation notifications, etc.

In some examples, the processor 118 may execute object presentation event detector 116 instructions to implement and/or execute the object presentation event detector 116. The object presentation event detector 116 may detect an object presentation event. For example, the object presentation event detector 116 may detect calls to the processor 118 to present an object (e.g., window, notification, image, user interface, button, icon, etc.). For example, the object presentation event detector 116 may monitor calls to one or more functions that cause an object to be presented. In some examples, the object presentation event detector 116 may monitor for a particular type of object presentation event (e.g., notifications, notifications from one or more specific programs, etc.).

The processor 118 may present an object on the viewed display. For example, the processor 118 may present the object on the viewed display of the displays 126a-n as indicated by the machine learning model 110.

In some examples, the computing device 102 may omit one or more of the elements described in connection with FIG. 1. In one example, the computing device 102 may include the camera 124, displays 126a-n, and interface device 128, and may not include the communication interface 122. In some examples, the computing device 102 may omit the data store 120. It should be noted that in some examples, after training, the viewed display inference and/or selection may be based on a single image obtained in response to an object presentation event. For example, the computing device 102 may not run inference over consecutive frames. This may help to conserve energy and lessen processing load. In some examples, the computing device 102 may run inference for frames obtained in response to object presentation events. In some examples, the computing device 102 may run inference for frames obtained in response to object presentation events.

Figure 2:
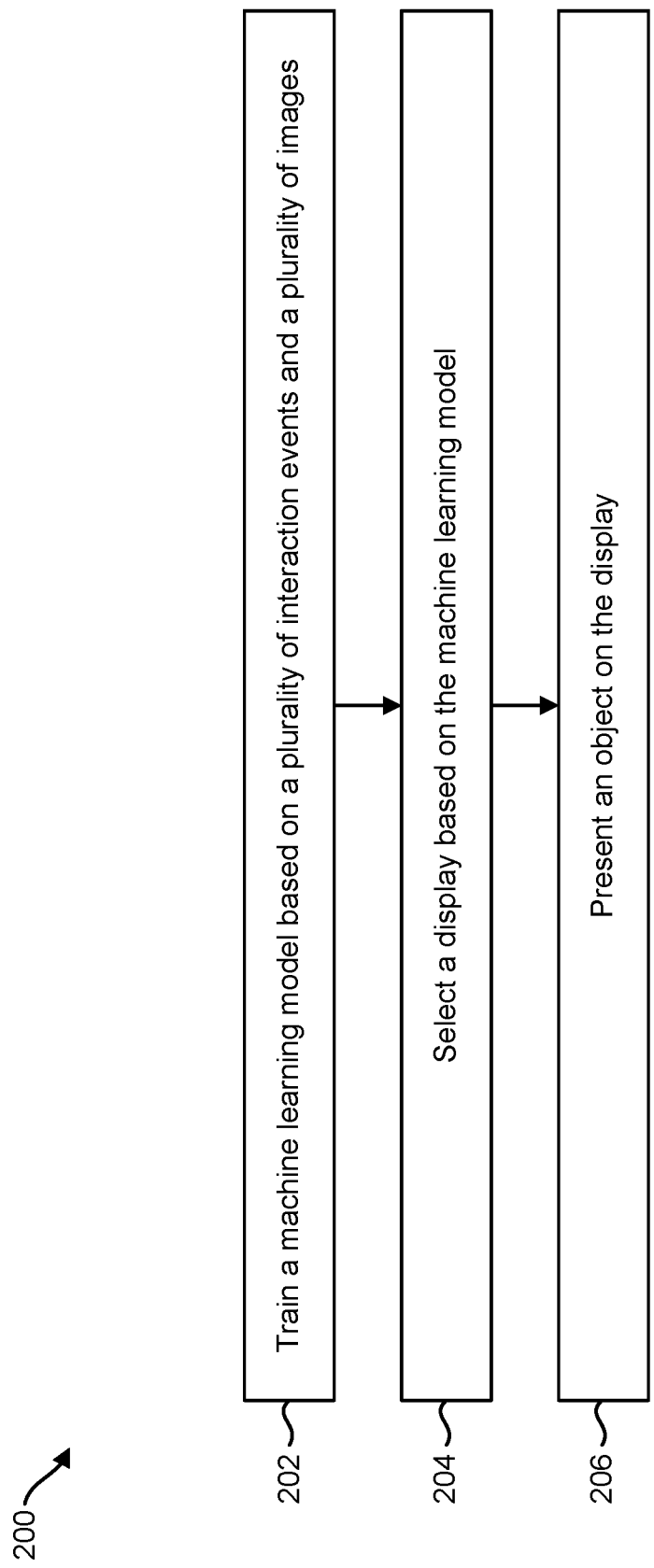
FIG. 2 is a flow diagram illustrating an example of a method for selecting a display with machine learning.

FIG. 2 is a flow diagram illustrating an example of a method 200 for selecting a display with machine learning. The method 200 may be performed by an electronic device. For example, the method 200 may be performed by the computing device 102 described in connection with FIG. 1.

In some examples, the computing device 102 may detect a plurality of interaction events. For example, detecting the plurality of interaction events may be performed as described in connection with FIG. 1. For instance, the computing device 102 may detect an interaction event in response to an input from an interface device 128.

In some examples, the computing device 102 may obtain a plurality of images of a user corresponding to the plurality of interaction events. For example, obtaining the plurality of images of a user corresponding to the plurality of interaction events may be performed as described in connection with FIG. 1. For instance, the computing device 102 may receive and/or capture an image for each of the plurality of interaction events.

The computing device 102 may train 202 a machine learning model 110 based on a plurality of interaction events and a corresponding plurality of images. Each of the plurality of interaction events may correspond to one of a plurality of displays 126a-n. In some examples, training 202 the machine learning model 110 may be performed as described in connection with FIG. 1. For example, the computing device 102 may adjust weights of the machine learning model 110 such that the machine learning model 110 indicates the display corresponding to each of the interaction events for each of the images. In some examples, a number of outputs of the machine learning model may be equal to a number of the plurality of displays 126a-n.

The computing device 102 may select 204 a display 126 of the plurality of displays 126a-n based on the machine learning model 110. In some examples, selecting 204 a display 126 based on the machine learning model 110 may be performed as described in connection with FIG. 1. For example, when the computing device 102 is to select a display 126, the computing device 102 may obtain an image (e.g., a current image of the user) and provide the image to the machine learning model 110. In some examples, selecting 204 the display 126 of the plurality of displays 126a-n is performed in response to an object presentation event. The machine learning model 110 may infer the viewed display based on the image. The computing device 102 may select the display 126 as indicated by the machine learning model 110. For example, the computing device 102 may designate one of the plurality of displays 126a-n for presenting an object.

The computing device 102 may present 206 an object on the display 126. In some examples, presenting 206 the object may be performed as described in connection with FIG. 1. For example, the computing device 102 may provide object data (e.g., pixel data representing an object, such as a notification) to the selected display 126 for presentation.

In some examples, the computing device 102 may receive a user input to activate data collection, training, and/or display selection. For example, the computing device 102 may start collecting images from a fixed positioned camera 124 at each user mouse click. It may be assumed that the user is looking at the cursor when the mouse is clicked. Accordingly, the image from the camera 124 at that time may be assigned to that specific display or position on the display.

With enough collected samples (e.g., images and interaction events), a machine learning model may be trained to infer or predict where the user is looking based on an image from the camera 124. In some examples, the number of outputs of the machine learning model 110 may be the same as the number of the displays. For each sample image, a display 126 may be assigned as a label for training. In some examples, after a defined amount of training (e.g., after an amount of time, number of samples, etc.), the machine learning model 110 may be ready to be used for inference. When a new notification arrives, the computing device 102 may perform an inference using the trained machine learning model 110, and a notification may be displayed on the display 126 with the highest probability of being viewed by the user.

Figure 3:
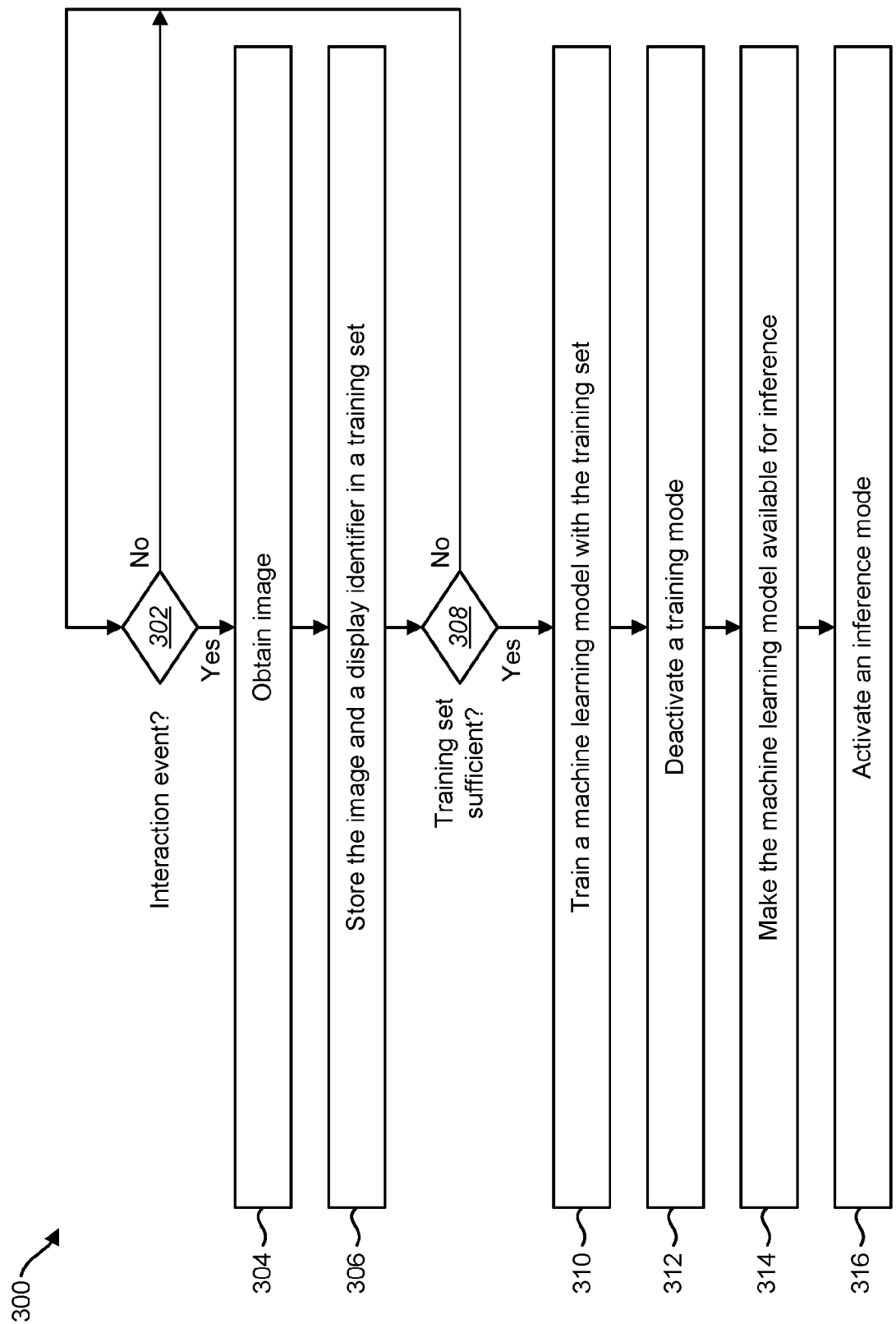
FIG. 3 is a flow diagram illustrating an example of a method for training a machine learning model.

FIG. 3 is a flow diagram illustrating an example of a method 300 for training a machine learning model. The method 300 may be performed by an electronic device. For example, the method 300 may be performed by the computing device 102 described in connection with FIG. 1.

The computing device 102 may determine 302 whether an interaction event is detected. For example, if an input (e.g., click, touch, etc.) is received from an interface device 128 and/or if the computing device 102 responds to an input (e.g., registers a click, touch, raises an interaction event, etc.), an interaction event may be detected. The computing device 102 may obtain a display identifier corresponding to the interaction event. For example, the computing device 102 may determine which display 126 of the plurality of displays 126a-n corresponds to the interaction event. For example, the computing device 102 may determine a location of a cursor in a display space and the display corresponding to that location of the display space. The display space may be a space mapped across multiple displays, where portions of the display space (e.g., ranges) are mapped to different displays. If the location of the cursor is within one of the portions (e.g., ranges) corresponding to a display, the display (e.g., display identifier) of that portion may be determined. In another example, a touch or contact location of a touchscreen may indicate the display (e.g., display identifier).

If an interaction event is detected, the computing device 102 may obtain 304 an image. For example, obtaining the image may be performed as described in connection with FIG. 1. For instance, the computing device 102 may receive and/or capture an image in response to determining the interaction event.

The computing device 102 may store 306 the image and display identifier in a training set. A training set may be a set of data (e.g., images and associated display identifiers). For example, some or all of the images 108 and/or some of all of the display identification data 130 may be included in the training set.

The computing device 102 may determine 308 whether the training set is sufficient (e.g., sufficient for training). In some examples, a training set may be determined to be sufficient if the training set includes a minimum threshold number of images (e.g., 1000, 5000, 10,000, etc.). In some examples, a training set may be determined to be sufficient if the training set includes a minimum threshold diversity of data. For example, if the training set includes a minimum threshold number of data points (e.g., images with associated display identifiers) for each display 126 in the plurality of displays 126a-n, the training set may be determined to be sufficient. Otherwise (e.g., if the training set includes less than the minimum threshold of images and/or less than the minimum threshold diversity of data), the training set may be determined to be insufficient (e.g., insufficient for training). In a case that the training set is insufficient, operation may return to determining 302 whether an interaction event is detected (in order to collect additional data, for example).

In a case that the training set is determined 308 to be sufficient, the computing device 102 may train 310 a machine learning model 110 with the training set (e.g., a plurality of interaction events and a corresponding plurality of images). In some examples, training 310 the machine learning model 110 may be performed as described in connection with one or more of FIGS. 1-2.

In some examples, a training mode may include one or more data collection operations (e.g., collecting images and corresponding display identifiers) and/or training the machine learning model 110. In the example of the method 300, a training mode may include determining 302 whether interaction events are detected, obtaining 304 images, storing 306 the images and display identifiers, determining 308 whether the training set is sufficient, and/or training 310 the machine learning model 110. In some examples, one or more training mode operations may be performed as background operations on the computing device 102. For example, training mode operations may be performed while a user continues to interact with the computing device. In some examples, the machine learning model 110 may be trained using less than a threshold amount of processing while use of the computing device 102 is ongoing. In some examples, the training mode may not include an explicit calibration procedure, where a user is instructed to take specific actions (e.g., "look at this display," "click in this region," etc.). In some examples, the training mode may perform one or more operations that are transparent to the user (e.g., using samples from normal use of the computing device and/or using samples from interactions with applications unrelated to training mode instructions).

In some examples, the computing device 102 may deactivate 312 a training mode. For example, deactivating 312 the training mode may include discontinuing to collect training set data and/or discontinuing training of the machine learning model. In some examples, the training mode may not be deactivated and/or the training mode may continue after an initial training of the machine learning model 110. For example, training may continue to be performed in order to refine the training of the machine learning model 110 while the machine learning model 110 is utilized to infer viewed displays.

In some examples, the computing device 102 may make 314 the machine learning model 110 available for inference. For example, the computing device 102 may enable utilization of the machine learning model 110 for inferring (e.g., determining) a viewing display based on an image (e.g., current image). In some examples, the computing device 102 may set a flag in the machine-readable storage medium 104 to indicate that that machine learning model 110 is available for inference (e.g., that training of the machine learning model 110 is complete and/or validated).

In some examples, the computing device 102 may activate 316 an inference mode. An inference mode may include obtaining an image (for inference), inferring a viewing display based on the image with the machine learning model 110, selecting a display 126, and/or presenting an object on the display 126. In some examples, activating 316 the inference mode may be performed in response to determining 308 that the training set is sufficient for training the machine learning model 110.

Figure 4:
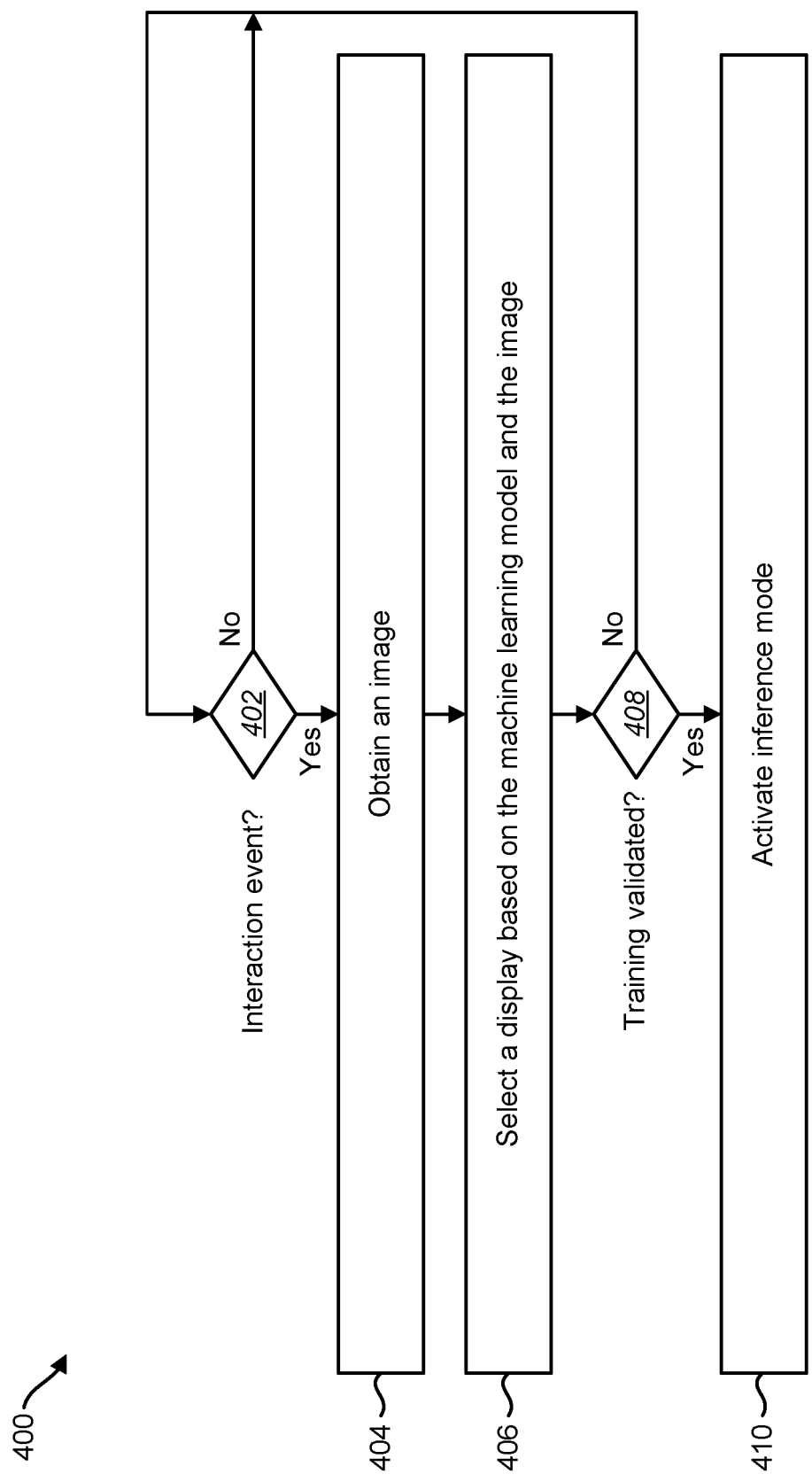
FIG. 4 is a flow diagram illustrating an example of a method for validating the training of a machine learning model.

FIG. 4 is a flow diagram illustrating an example of a method 400 for validating the training of a machine learning model. For example, validating the training may include performing one or more of the operations described in the method 400. The method 400 may be performed by an electronic device. For example, the method 400 may be performed by the computing device 102 described in connection with FIG. 1.

The computing device 102 may determine 402 whether an interaction event is detected. For example, if an input (e.g., click, touch, etc.) is received from an interface device 128 and/or if the computing device 102 responds to an input (e.g., registers a click, touch, raises an interaction event, etc.), an interaction event may be detected. The computing device 102 may obtain a display identifier corresponding to the interaction event. Accordingly, the computing device 102 may detect an interaction event corresponding to an identified display 126 of the plurality of displays 126*a-n*. For example, the computing device 102 may determine which display 126 of the plurality of displays 126*a-n* corresponds to the interaction event. For example, the computing device 102 may determine a location of a cursor in a display space and the display corresponding to that location of the display space. In another example, a touch or contact location of a touchscreen may indicate the display (e.g., display identifier).

If an interaction event is detected, the computing device 102 may obtain 404 an image. For example, obtaining 404 the image of the user may be performed as described in connection with FIG. 1. For instance, the computing device 102 may send a command to a camera 124 to capture the image and/or may receive an image from the camera 124.

The computing device 102 may select 406 a display 126 based on the machine learning model 110 and the image. In some examples, selecting 406 a display 126 may be performed as described in connection with FIG. 1. For example, the machine learning model 110 may infer the viewed display based on the image. The computing device 102 may select 406 the display 126 as indicated by the machine learning model 110. Accordingly, the computing device 102 may select an inferred display 126 of the plurality of displays 126*a-n* based on the machine learning model 110 and the image.

The computing device 102 may determine 408 whether the training of the machine learning model 110 is validated. In some examples, validating the training and/or determining 408 whether the training is validated may be performed by the computing device 102 described in connection with FIG. 1. In some examples, the computing device 102 may determine 408 that the training is validated by determining that the inferred display that is selected 406 based on the machine learning model is the identified display corresponding to the interaction event. Otherwise, the training may be determined 408 as not validated. In some examples, the computing device 102 may determine 408 that the training is validated by determining that a threshold number of inferred displays that are selected 406 based on the machine learning model are the identified displays corresponding to interaction events. Validating the training may ensure that the machine learning model 110 training is sufficient to provide accurate results in inferring viewed displays.

In a case that the training is not validated, the computing device 102 may continue to train the machine learning model 110. For example, the computing device 102 may collect more data (e.g., identified displays with interaction events and images) for training. For instance, operation may return to detecting interaction events and obtaining corresponding images, which may be utilized to further train the machine learning model and/or to perform additional validation operations.

In some examples, the computing device 102 may activate 410 an inference mode in a case that it is determined 408 that the training is validated. The inference mode may include detecting an object presentation event and selecting a display in response to detecting the object presentation event. In some examples, the inference mode may include notification triggering, in which a display selection may be triggered in response to a notification event. In some examples, the computing device 102 may activate notification triggering of selecting the display in response to determining 408 that the training is validated.

In some examples, the computing device 102 may deactivate a training mode in response to determining 408 that the training is validated. For example, deactivating the training mode may include discontinuing to collect training set data and/or discontinuing training of the machine learning model. In some examples, the training mode may not be deactivated and/or the training mode may continue after validation of the machine learning model 110.

Figure 5:
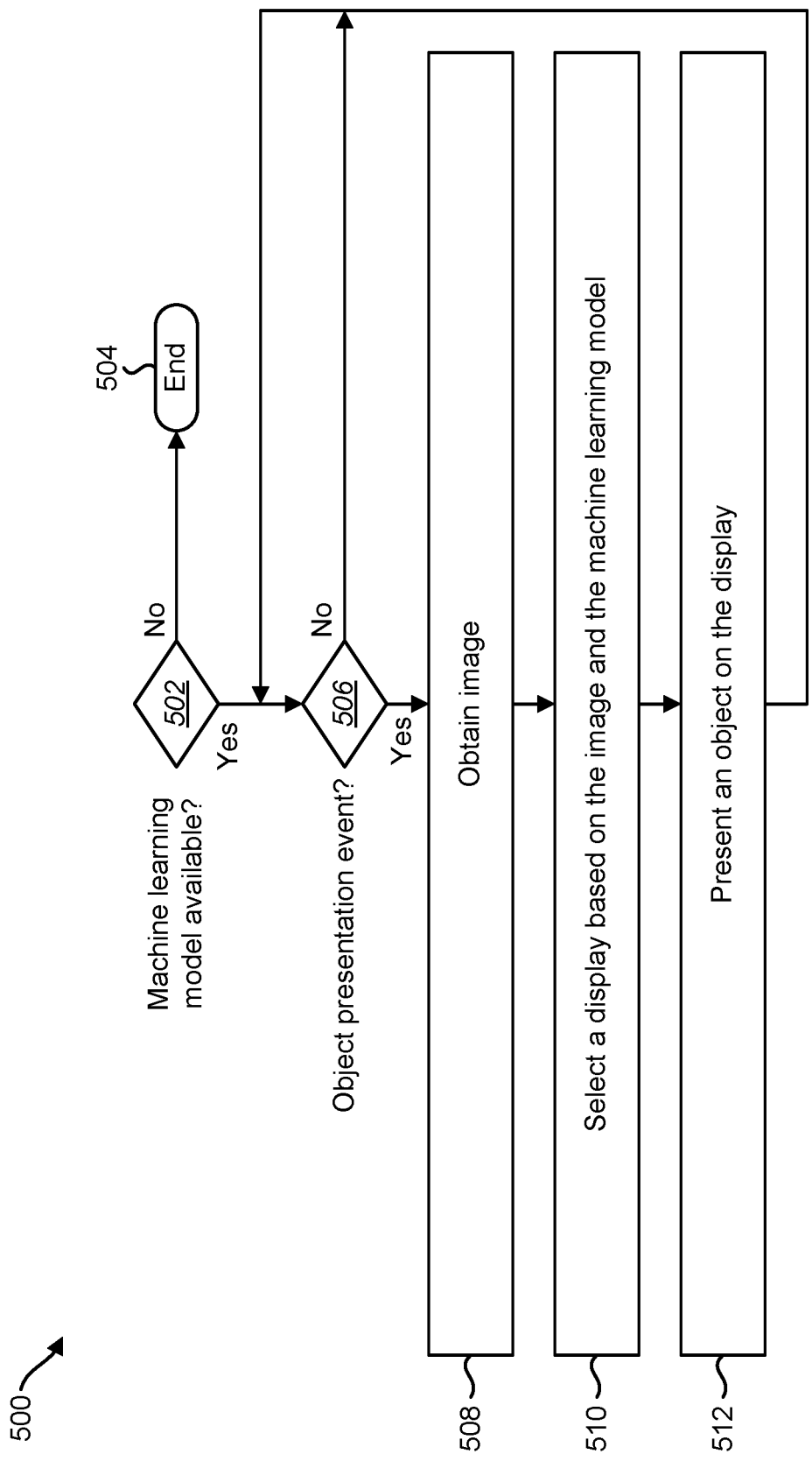
FIG. 5 is a flow diagram illustrating an example of a method for selecting a display with machine learning.

FIG. 5 is a flow diagram illustrating an example of a method 500 for selecting a display with machine learning. The method 500 may be performed by an electronic device. For example, the method 500 may be performed by the computing device 102 described in connection with FIG. 1.

In some examples, the computing device 102 may determine 502 whether a machine learning model 110 is available. For example, the computing device 102 may determine whether machine learning model training is complete and/or validated. In some examples, when the machine learning model training is complete and/or validated, the computing device 102 may set a flag in a machine-readable storage medium 104 (e.g., memory) indicating that the machine learning model 110 is available. The computing device 102 may read the flag to determine 502 whether the machine learning model 110 is available or not.

In a case that the machine learning model 110 is not available (e.g., training is not yet complete and/or the training has not been validated), operation may end 504. In some examples, in a case that the machine learning model 110 is not available, the computing device 102 may continue to collect data for the training set and/or continue to train the machine learning model 110 until the machine learning model 110 is available. In some examples, the computing device 102 may activate an inference mode in response to determining 502 that the machine learning model is available.

In a case that the machine learning model 110 is available, the computing device 102 may determine 506 whether an object presentation event is detected. In some examples, determining 506 whether an object presentation event is detected may be performed as described in connection with FIG. 1. For example, the computing device 102 may detect a call to present an object (e.g., window, notification, image, user interface, button, icon, etc.). In some examples, the computing device 102 may monitor for a particular type of object presentation event (e.g., notifications, notifications from one or more specific programs, etc.).

In a case that an object presentation event is detected, the computing device 102 may obtain 508 an image. For example, obtaining the image may be performed as described in connection with FIG. 1. For instance, the computing device 102 may receive and/or capture an image in response to determining 506 that an object presentation event is detected.

The computing device 102 may select 510 a display 126 based on the image and the machine learning model 110. In some examples, selecting 510 a display 126 based on the image and the machine learning model 110 may be performed as described in connection with FIG. 1. For example, the machine learning model 110 may infer the viewed display based on the image. The computing device 102 may select the display 126 as indicated by the machine learning model 110. For example, the computing device 102 may designate one of the plurality of displays 126*a-n* for presenting an object.

The computing device 102 may present 512 an object on the display 126. In some examples, presenting 512 the object may be performed as described in connection with FIG. 1. For example, the computing device 102 may provide object data (e.g., pixel data representing an object, such as a notification) to the selected display 126 for presentation.

Figure 6:
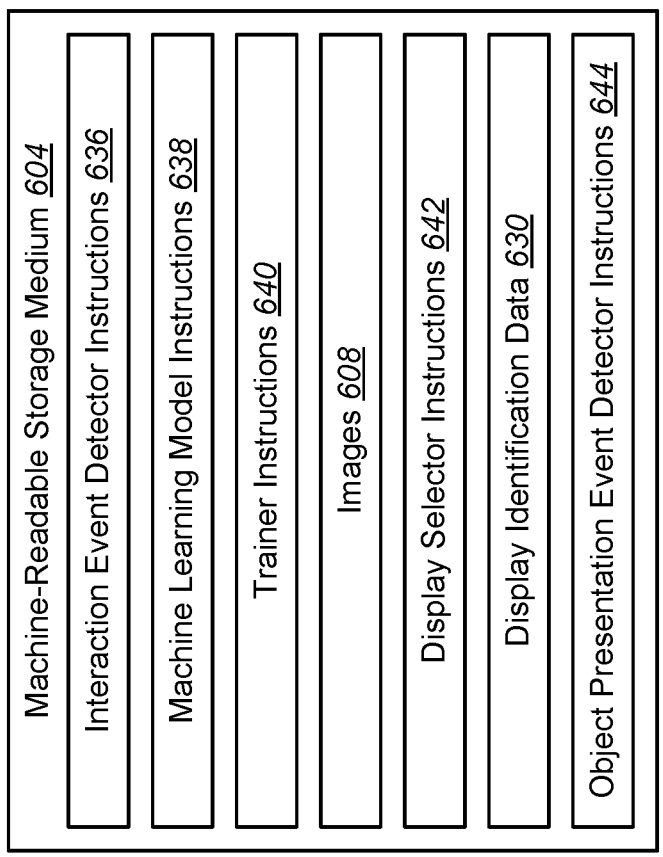
FIG. 6 is a block diagram illustrating an example of a machine-readable storage medium for selecting a display with machine learning.

FIG. 6 is a block diagram illustrating an example of a machine-readable storage medium 604 for selecting a display with machine learning. Examples of the machine-readable storage medium 604 may include RAM, EEPROM, a storage device, an optical disc, and the like. In some implementations, the machine-readable storage medium 604 may be housed in a computing device or externally from a computing device (e.g., computing device 102). For example, the machine-readable storage medium 604 may be a solid-state drive (SSD) housed in a computing device or may be external flash memory that may be coupled to a computing device. In some implementations, the machine-readable storage medium 604 may be an example of the machine-readable storage medium 104 described in connection with FIG. 1. In some examples, the machine-readable storage medium 604 described in connection with FIG. 4 may be utilized instead of (e.g., in place of) the machine-readable storage medium 104 described in connection with FIG. 1. The machine-readable storage medium 604 may include code (e.g., instructions) that may be executed by processor(s) (e.g., a computing device).

In some examples, the machine-readable storage medium 604 may include interaction event detector instructions 636, machine learning model instructions 638, trainer instructions 640, images 608 (e.g., image data), display selector instructions 642, display identification data 630, and/or object presentation event detector instructions 644. It should be noted that one or more of the instructions and/or data described in connection with FIG. 6 may be omitted from the machine-readable storage medium 604 and/or stored on another storage medium 604.

When executed, the interaction event detector instructions 636 may cause a computing device to detect an interaction event. For example, the interaction event detector instructions 636 may cause a computing device (e.g., computing device 102) to determine that an interaction event is detected (e.g., an input from an interaction device is received and/or the computing device has responded to the input).

When executed, the interaction event detector instructions 636 may cause a computing device to identify one display of a plurality of displays corresponding to each interaction event (e.g., obtain a display identifier). For example, the interaction event detector instructions 636 may cause a computing device to identify a display on which a cursor is located when a click is received. In another example, the interaction event detector instructions 636 may cause a computing device to identify a display from which a touchscreen tap is received. Data indicating the display (e.g., a display identifier) may be stored as display identification data 630 on the machine-readable storage medium 604 and/or on another storage medium (e.g., memory, storage, etc.).

When executed, the interaction event detector instructions 636 may cause a computing device to capture an image of a user for each interaction event. Capturing the image may be performed in response to detection of an interaction event. In some examples, the computing device may command a camera or image sensor to capture an image of the user. Image 608 may be stored as on the machine-readable storage medium 604 and/or on another storage medium (e.g., memory, storage, etc.).

The machine learning model instructions 638 may be instructions for executing a machine learning model. When executed, the machine learning model instructions 638 may cause a computing device to determine (e.g., infer) a viewed display of a plurality of displays. In some examples, the machine-readable storage medium 604 may include data associated with the machine learning model instructions 638. For example, the data may include weights of the machine learning model.

When executed, the trainer instructions 640 may cause a computing device to train a machine learning model based on the plurality of images and the identified displays. For example, the computing device may adjust the weights of the machine learning model such that the machine learning model correctly identifies a viewed display (e.g., the display corresponding to the input and/or interaction event) from the image captured in response to the input and/or interaction event.

When executed, the object presentation event detector instructions 644 may cause a computing device to detect an object presentation event (e.g., notification event). For example, the computing device may detect calls to present an object (e.g., window, notification, image, user interface, button, icon, etc.). For example, the computing device may monitor calls to one or more functions that cause an object to be presented. In some examples, the object presentation event detector 116 may monitor for notification events.

When executed, the display selector instructions 642 may cause a computing device to determine, using the machine learning model in response to a notification event, a viewed display of the plurality of displays. For example, the display selector instructions 642 may cause a computing device to select a display indicated by an output of the machine learning model.

When executed, the display selector instructions 642 may cause a computing device to present a notification on the viewed display. For example, the computing device may output a notification to the viewed display.

In some examples, the machine-readable storage medium 604 may include instructions to deactivate a training mode in response to determining that the plurality of images and the identified displays are sufficient for training the machine learning model. In some examples, the machine-readable storage medium may include instructions to validate the training of the machine learning model.

Figure 7:
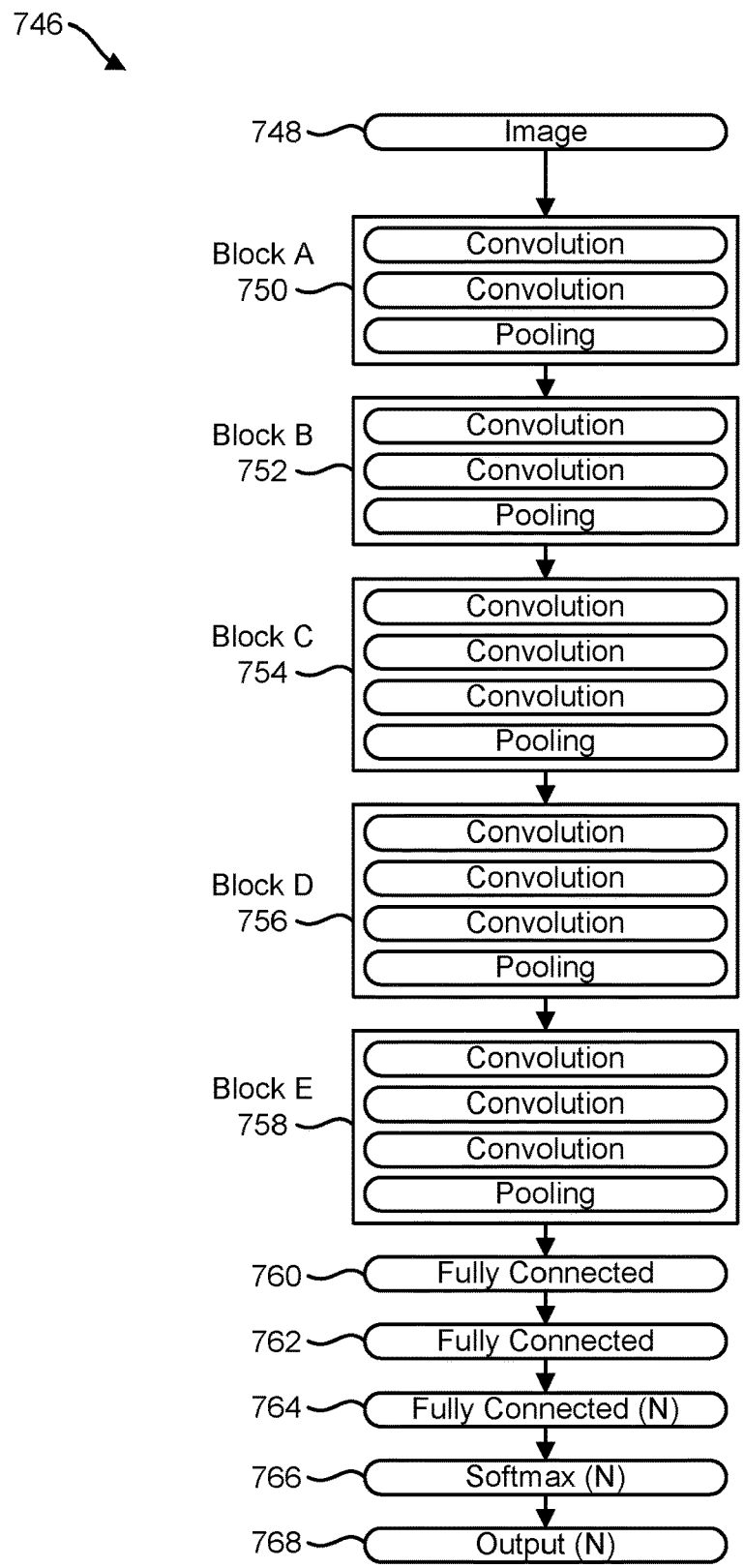
FIG. 7 is a block diagram illustrating an example of a neural network.

FIG. 7 is a block diagram illustrating an example of a neural network 746. The neural network 746 may be an example of a machine learning model described herein. In the example described in connection with FIG. 7, N denotes a number of displays. In some examples, one or more dimensionalities of the neural network 746 may be set or determined based on the number of displays.

An input image 748 may be provided to the neural network 746. In some examples, the input image 748 may be a red-green-blue (RGB) image. For example, the input image 748 may be an RGB image with dimensions of width×height×channels. For instance, the input image 748 may have dimensions of 224 (pixels)×224 (pixels)×3 (Red, Green, and Blue channels).

In the example of FIG. 7, the neural network includes five blocks: block A 750, block B 752, block C 754, block D 756, and block E 758. Each of the blocks includes convolution layers and a pooling layer. In this example, block A 750 includes two convolution layers and a pooling layer, block B 752 includes two convolution layers and a pooling layer, block C 754 includes three convolution layers and a pooling layer, block D 756 includes three convolution layers and a pooling layer, and block E 758 includes three convolution layers and a pooling layer. Each convolution layer may include a convolution filter with a receptive field. Each pooling layer may combine the outputs of the convolution layers. An example of a pooling layer is max pooling, which may take a maximum value from the respective block.

The neural network 746 may include fully connected layers 760, 762, 764. In some examples, a fully connected layer may connect all of the neurons in one layer to all neurons in another layer. The output of block E 758 may be provided to the first fully connected layer 760. In an example, the first fully connected layer 760 may have a dimensionality of 4096. The output of the first fully connected layer 760 may be provided to the second fully connected layer 762. In an example, the second fully connected layer 762 may have a dimensionality of 4096. The output of the second fully connected layer 762 may be provided to the third fully connected layer 764. In an example, the third fully connected layer 764 may have a dimensionality of N (e.g., the number of displays).

The neural network 746 may include a softmax layer 766. The softmax layer 766 may perform the softmax function. For example, the softmax layer 766 may perform the softmax function on the output of the third fully connected layer 764. In some examples, the softmax function is a normalized exponential function. For example, the softmax function transforms the values of the N channels of a fully connected layer into an N-dimensional vector, where all of the values of the N-dimensional vector sum to 1. The softmax layer output may be provided for the N channels (e.g., N outputs) of an output layer 768. The values of the output layer 768 may indicate which of the displays is a viewed display as inferred by the neural network 746. For example, the output or channel of the output layer 768 with the highest value may correspond to most likely viewed display of the plurality of displays. In some examples, a computing device may select a display to present an object based on the values of the output layer 768.

It should be noted that while various examples of systems and methods are described herein, the disclosure should not be limited to the examples. Variations of the examples described herein may be implemented within the scope of the disclosure. For example, one or more steps, functions, aspects, or elements of the examples described herein may be omitted or combined.

The invention claimed is:

1. A method performed by an electronic device, comprising:
    training a machine learning model using a plurality of interaction events and a corresponding plurality of images, wherein each of the plurality of interaction events corresponds to one of a plurality of displays;
    detecting an object presentation event for which an object is to be displayed;
    in response to the object presentation event, providing an image captured by a camera to the machine learning model;
    selecting a display of the plurality of displays, based on an output of the machine learning model, for displaying the object, the output indicative of the display being viewed by a user; and
    presenting the object on the display in response to selecting the display.

2. The method of claim 1, wherein a number of outputs of the machine learning model is equal to a number of the plurality of displays.

3. The method of claim 1, further activating an inference mode in response to determining that a training set is sufficient for training the machine learning model.

4. The method of claim 1, further comprising validating the training of the machine learning model.

5. The method of claim 4, further comprising deactivating a training mode in response to validating the training.

6. The method of claim 4, further comprising activating notification triggering of the selecting the display in response to validating the training.

7. The method of claim 4, wherein validating the training of the machine learning model comprises:
    detecting a first interaction event corresponding to an identified display of the plurality of displays;
    obtaining a first image of a user;
    selecting an inferred display of the plurality of displays based on the machine learning model and the first image; and
    determining that the inferred display selected based on the machine learning model is the identified display corresponding to the first interaction event.

8. The method of claim 4, wherein validating the training of the machine learning model comprises comparing a threshold number to a number of correctly selected inferred displays corresponding to the interaction events.

9. A computing device, comprising:
    a processor;
    a memory in electronic communication with the processor; and
    instructions stored in the memory, wherein the instructions are executable by the processor to:
        receive a plurality of inputs from an interface device;
        identify displays of a plurality of displays respectively corresponding to the plurality of inputs, wherein the plurality of inputs includes at least one of a click, a touch, a signal, a gesture, a motion, or a sound;
        receive a plurality of images from a camera, wherein each of the plurality of images is respectively captured in response to each of the plurality of inputs;
        train a machine learning model based on the plurality of images and the identified displays;
        deactivate a training mode in response to determining that the plurality of images and the identified displays are sufficient for training the machine learning model;
        determine, using the machine learning model in response to an object presentation event, a viewed display of the plurality of displays; and
        present, based on the object presentation event, an object on the viewed display.

10. The computing device of claim 9, wherein the instructions are executable to:
    determine a number of the plurality of the displays; and
    set a number of outputs of the machine learning model based on the number of the plurality of the displays.

11. The computing device of claim 10, wherein a number of outputs of the machine learning model is equal to a number of the plurality of displays.

12. The computing device of claim 9, wherein the object presentation event is a notification event.

13. A non-transitory machine-readable storage medium encoded with instructions executable by a processor, the machine-readable storage medium comprising instructions to:
    identify one display of a plurality of displays corresponding to each of a plurality of interaction events;
    capture an image of a user for each of the plurality of interaction events;
    train a machine learning model based on the images and the identified displays;
    deactivate a training mode in response to determining that the images and the identified displays are sufficient for training the machine learning model; and
    present a notification on the viewed display.

14. The storage medium of claim 13, further comprising instructions to validate the training of the machine learning model.

15. The storage medium of claim 13, further comprising instructions to capture the image of the user in response to each of the plurality of interaction events, each interaction event including receipt of a user input via an interface device.

* * * * *